United States Patent [19]
Watabe et al.

[11] Patent Number: 5,587,776
[45] Date of Patent: Dec. 24, 1996

[54] MEMBER COMPRISING A POLYURETHANE RUBBER COMPOSITION CONTAINING AN AMINO CATALYST FOR REGULATING QUANTITY OF DEVELOPER AND DEVELOPING UNIT USING THE SAME

[75] Inventors: Masahiro Watabe; Noriyuki Yanai, both of Yokohama; Kentaro Niwano; Arihiro Yamamoto, both of Tokyo, all of Japan

[73] Assignee: Canon Kabushiki Kaisha, Tokyo, Japan

[21] Appl. No.: 358,092

[22] Filed: Dec. 16, 1994

[30] Foreign Application Priority Data

Dec. 22, 1993 [JP] Japan ................... 5-324576

[51] Int. Cl.⁶ ........................... G03G 15/06
[52] U.S. Cl. ............. 355/245; 118/653; 355/259
[58] Field of Search ................... 355/245, 259; 118/261, 653

[56] References Cited

U.S. PATENT DOCUMENTS

| | | | |
|---|---|---|---|
| 4,666,815 | 5/1987 | Imai et al. | 430/126 |
| 5,142,330 | 8/1992 | Hirano et al. | 355/259 |
| 5,168,312 | 12/1992 | Aoto et al. | 355/259 |
| 5,191,170 | 3/1993 | Yoshida et al. | 355/245 X |
| 5,353,104 | 10/1994 | Kato et al. | 355/259 |
| 5,379,097 | 1/1995 | Aoto et al. | 355/259 |

*Primary Examiner*—William J. Royer
*Attorney, Agent, or Firm*—Fitzpatrick, Cella, Harper & Scinto

[57] ABSTRACT

The present invention relates to a member for regulating the quantity of a developer, that is free from deterioration in the physical properties thereof, even if the same is used for a long time. The member regulates the quantity of a developer being made of a polyurethane rubber composition which contains an amine-type catalyst.

10 Claims, 2 Drawing Sheets

| 5,587,776 |

MEMBER COMPRISING A POLYURETHANE RUBBER COMPOSITION CONTAINING AN AMINO CATALYST FOR REGULATING QUANTITY OF DEVELOPER AND DEVELOPING UNIT USING THE SAME

BACKGROUND OF THE INVENTION

1. Field of the Invention

The present invention relates to a member for regulating the quantity of a developer for use to develop an electrostatic latent image formed on an image carrying member so as to form a visible image, and also to a developing unit using the member for regulating the quantity of a developer.

2. Related Background Art

A developing unit, as shown in FIG. 2, comprises a developer carrying member 3 (hereinafter a "developing sleeve") attached to a developer container 2 and disposed at a predetermined distance from the electrophotographic photosensitive member 1; a blade 4 (hereinafter an "elastic blade") for regulating the quantity of the developer; an elastic roller 5; and a one-component developer 6 (hereinafter "toner"). As a means for reducing the thickness of a toner layer, which is carried by the developing sleeve to the developing portion, a structure has been known in which the elastic blade 4 is brought into contact with the developing sleeve to regulate the toner, which is allowed to pass through a nip formed between the elastic blade 4 and the developing sleeve 3, to form a thin layer of toner on the developing sleeve 3; and a frictionally generated electric charge (triboelectricity) for forming a latent image is supplied to the toner 6 in the contact portion between the elastic blade 4 and the developing sleeve 3.

Since distribution of the size of toner particles ranges from several microns to tens of microns in the toner layer formed on the developing sleeve 3, the development process using the elastic blade 4 is required to accurately bring the elastic blade 4 to the top end of the surface of the developing sleeve, to frictionally generate an electrical charge to the toner 6 held between the developing sleeve 3 and the elastic blade and to form a uniform thin layer on the developing sleeve 3.

Referring now to FIGS. 1A and B as an elastic blade 4 for regulating the quantity of the developer 6, a rubber member 14 or a member 7 manufactured by integrating a supporting member 7a made of metal foil or a plastic sheet and a rubber member 7b has been used. As the rubber member, a urethane rubber elastic member for regulating the quantity of a developer has been used.

As the urethane rubber member, adipate urethane rubber containing polyester polyol as the molecular skeleton thereof has been mainly used for the purposes of wear resistance, low plasticity deformability and ease of frictional electricity charging.

However, a hydrolyzing reaction proceeds in the member for regulating the quantity of a developer using urethane rubber as time passes due to water in the air, causing the physical properties to deteriorate. Such deterioration leads to a fact that the pressure of the member for regulating the quantity of a developer to press the developing sleeve is lowered and, therefore, the set pressure level is changed undesirably or the area of contact is changed due to the deterioration in the hardness of the rubber. Thus, the ease in forming the thin layer and frictionally with electricity deteriorates.

An apparatus for developing an electrostatic latent image formed on the image carrying member to obtain a visible image, for example, a copying machine or a laser beam printer, encounters excessive rise in the temperature therein to about 40° C. and lowering in the temperature to the ambient temperature after the operation of the apparatus has been stopped. Therefore, dew condensation takes place repeatedly by a degree corresponding to the ambient humidity while subjecting the urethane elastic blade to a similar condition. Thus, the quality of the developed image is affected considerably by the deterioration occurring due to hydrolyzing reaction caused from the contact with water taking place in accordance with the temperature, humidity and the period of use.

In particular, the adipate urethane rubber containing polyester polyol as the molecular skeleton thereof has excellent characteristics exemplified by the wear resistance as compared with polyether polyol. However, the adipate urethane rubber containing the ester group that has poor resistance against hydrolysis encounters change in the molecular structure of urethane rubber, causing its initial mechanical characteristics to deteriorate such that the mechanical characteristics deteriorates rapidly in an exponential function manner due to factors, such as time, temperature and humidity. As a result, use of the adipate urethane rubber for a long time under a certain environment causes the hardness of the rubber to be changed and plastic deformation to take place due to deterioration in the mechanical characteristics. Thus, the reduction in the contact pressure with the developing sleeve deteriorates the ease in forming a thin layer and frictionally charging the toner. What is worse, the deterioration further increases the viscosity of the rubber, causing a problem to occur in that the rubber adheres to the developing sleeve or the toner.

Accordingly, suggestions have been made to use a hydrolysis prevention material capable of preventing hydrolysis of the urethane rubber and to use an anti-oxidant to prevent deterioration in the urethane rubber due to heat.

However, a desire for reducing the cost of the elastic blade made of urethane rubber and improving manufacturing yield raises the necessity of improving the urethane moldability and, thus, a catalyst capable of enhancing the reaction must be used in a considerably large quantity. The catalyst undesirably enhances the hydrolysis, thus causing a problem in that satisfactory quality cannot be obtained and the period, in which the urethane blade can be used, cannot be lengthened.

SUMMARY OF THE INVENTION

Accordingly, an object of the present invention is to provide a member for regulating the quantity of a developer, the developing performance of which cannot be deteriorated and which is therefore capable of being used for a long time.

Another object of the present invention is to provide a developing unit comprising a member for regulating the quantity of a developer that exhibits excellent durability.

The present invention is characterized in that a poylurethane rubber compound containing amine catalyst is used as the member for regulating the quantity of a developer. Use of such a member for regulating the quantity of a developer enables deterioration in the physical properties occurring due to hydrolysis, and the developing performance can be maintained. In addition, such a member for regulating the quantity of a developer can be used for a long time and, thus, the cost can be reduced and the manufacturing yield can be improved.

In order to raise the molding velocity of the urethane rubber, a method of increasing the quantity of the catalyst has been employed. As the catalyst for enhancing the reaction of the urethane rubber, either a tin-type catalyst, such as dibutyltine dilaurate or stanous octoate, or an amine type catalyst, such as triethylene diamine or tetramethylguanidine, is used or they are used in combination. The tin-type catalyst has an advantage of rapid reactivity, while the amine-type catalyst has an advantage that it can be easily handled, because the reaction speed is relatively constant with respect to scattering of the quantity of addition.

The relationship between the catalyst and the hydrolysis characteristics was examined in such a manner that the elastic blade made of urethane was mounted on a developing unit and the unit was mounted on a laser beam printer to be tested in ambient conditions in that the temperature was 32.5° C. and the relative humidity was 90%. The results indicate that the amine type catalyst exhibited excellent characteristics.

Other and further objects, features and advantages of the invention will be evident from the following detailed description of the preferred embodiments in conjunction with the attached drawings.

DESCRIPTION OF THE PREFERRED EMBODIMENTS

Figure 1A:
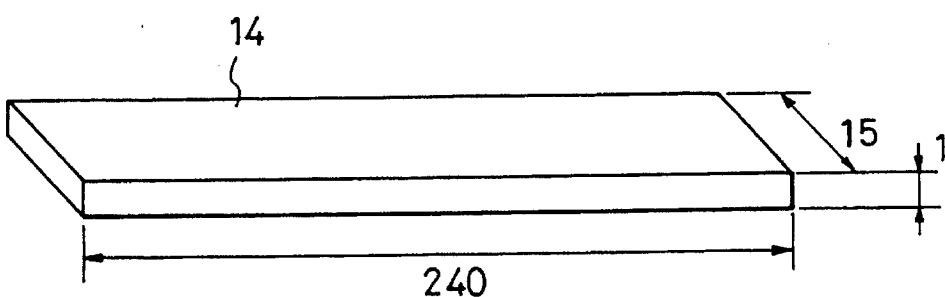
FIGS. 1A and B, are perspective views showing alternative embodiments of a blade member for regulating the quantity of a developer.
Figure 1B:
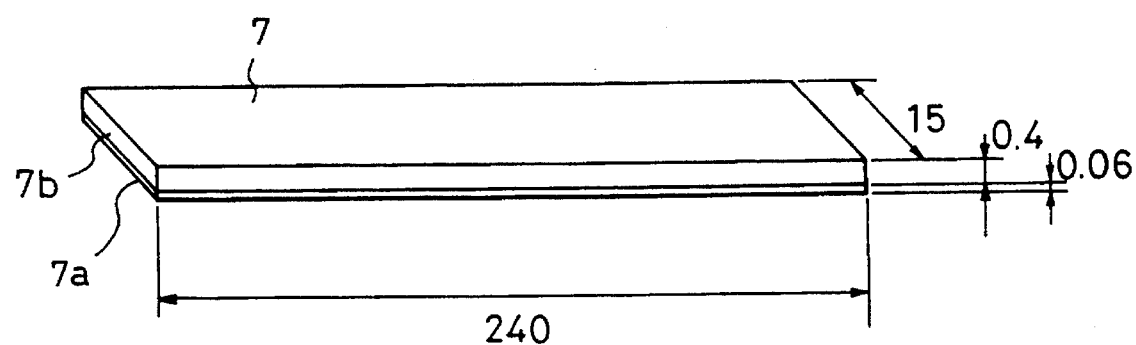
Figure 2:
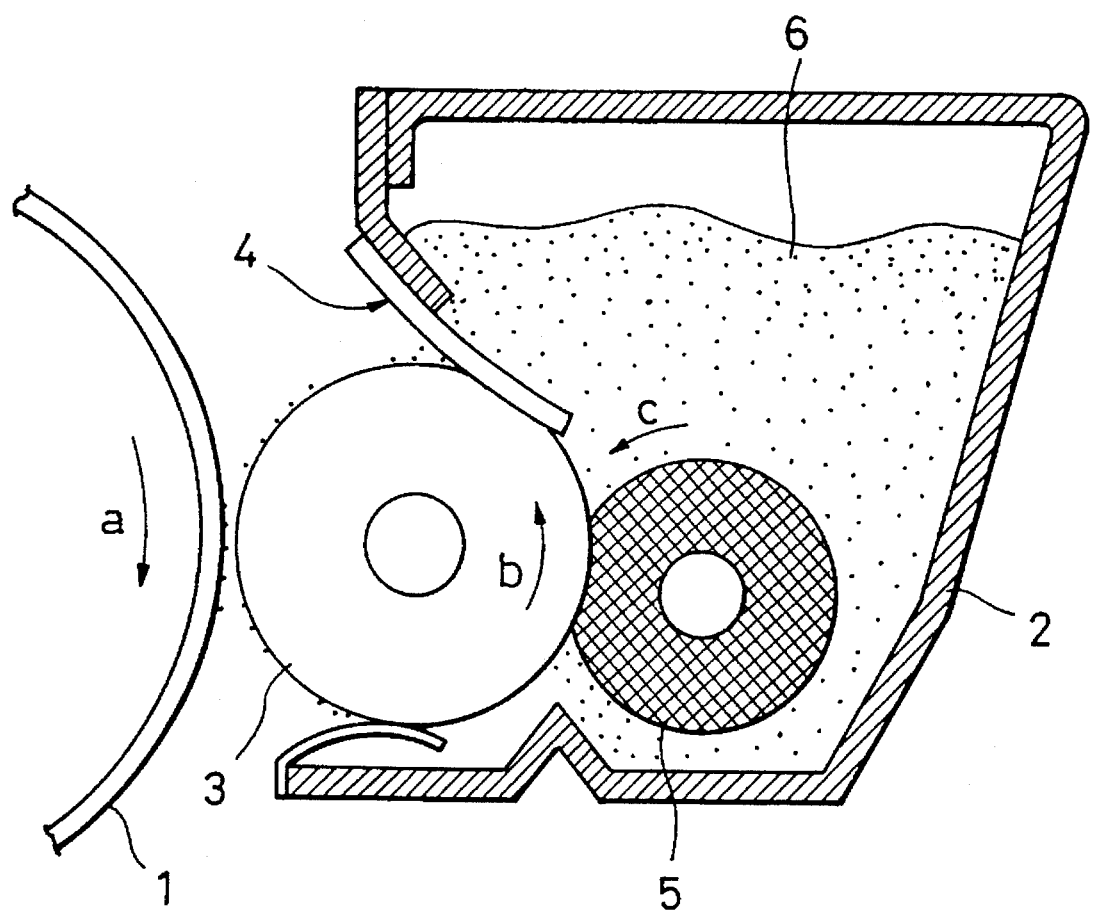
FIG. 2 is a diagram which illustrates a developing unit using the blade member of either FIGS. 1(A) or (B) for regulating the quantity of a developer.

As the amine reactive catalyst, it is preferable to use an amine-type catalyst exemplified by triethylene diamine, tetramethyl guanidine, pentamethyl diethylene triamine, dimethyl imidazole and tetramethyl propane diamine for improving the resistance against hydrolytic reaction. In particular, it is preferable to use triethylene amine or pentamethyl diethylene triamine.

The elastic blade is made of urethane, and can be manufactured by, for example, a pre-polymer method which has the steps of causing excess polyisocyanate and polyol to react with each other to prepare a prepolymer in which an end of the polyol contains an isocyanate group or a prepolymer in which the end contains non-reacted, and thus, free polyisocyanate; and causing polyol serving as a linking material to react with the prepolymer.

A preferred polyisocyanate component is exemplified by 2,4-toluenediisocyanate (TDI), its isomer, or their mixture; diphenylmethane-4,4'-diisocyanate (MDI), polymethylene polyphenyl polycyanate (polymeric-MID), carbodiimide denatured diphenylmethane-4,4'-diisocyanate, hydrogenated MDI, 1,5-naphthalene diisocyanate (NDI), hexamethylene diisocyanate, a system in which multifunctionated and denatured polyisocyanate or the like is used, for example, a system to which branched or pre-supplied trimethylol propane denatured diphenyl methane-4,4'-diisocyanate is added, or a system in which diphenylmethane-4,4'-diisocyanate denatured by a chain extending material, such as 1,4-butane diol, is added to the polyisocyante component. In particular, it is preferable to employ diphenylmethane-4,4'-diisocyanate material for securing safety (demulcent characteristics) of the working environment and for ease of reaction control.

The polyol component for use in the present invention is a mixture of compounds of long-chain polyol serving as the main chain component, a short-chain two-function compound serving as the chain extending component and three or more functional compounds serving as the linking material.

A preferred main-chain component of the polyol is exemplified by ethylene adipate polyester polyol or butylene adipate polyester polyol, each of which can be prepared from a dibasic acid and a polyalcohol; ethylene butylene adipate type polyester polyol obtainable from a combination of one or more kinds of dibasic acids and one or more kinds of polyalcohols; polylactone-type polyester polyol prepared from a ring-opening reaction of a lactone compound; an acryl compound of their polyol components; denatured polyol obtainable from a silicon compound or a fluorine compound; and a variety of the aforesaid polyol compounds. The allowable main-chain component is not limited to the polyester-type polyol. For example, polycarbonate-type polyol, polypropylene-type polyether polyol, polyethylene-type polyether polyol, polytetramethylene-type polyether polyol or a copolymer polyether-type polyol may be employed.

As the chain extending component, it is preferable to employ a dibasic amine compound, such as 3,3'-dichloro-4,4'-diaminodiphenylmethane or 4,4'-diaminodiphenyl methane; or a dihydroxy compound, such as ethylene glycol, 1,4-butane diol, bis($\beta$-hydroxyethyl) hydroquione ether or polyethylene glycol. As the linking material, it is preferable to employ three or more function compounds (glycerin or trimethylol propane).

If necessary, a material capable of preventing hydrolysis is added to the polyurethane rubber composition.

As the material for preventing hydrolysis, it is effective to add any one material selected from a group consisting of a carbodiimide compound, 4-t-butyl catechol, azodicarbonamide, azodicarboxylic ester and aliphatic amide. In particular, it is preferable to employ Stabaxol-1 or P or P-100 (each of which is trade name of Bayer) which is a carbodimide-type material in a quantity of 1 wt % or less.

If necessary, an anti-oxidant is added to the polyurethane rubber composition.

As the anti-oxidant, a phenol or amine type anti-oxidant may be employed. It is preferable that the phenol-type anti-oxidant be employed to prevent contamination of the member for carrying the developer and the toner. In particular, it is preferable to employ a hindered phenol type, polymeric and non-transfer type anti-oxidant. For example, it is preferable to use Irganox 1010, 1035 1076 (trade names of Nihon Chibaguiki) in a quantity of 1 wt % or less.

As for the hardness of the rubber in the elastic blade, if the rubber is too soft, then the area of contact (nip) between the developing sleeve and the elastic blade affecting the ease in charging the toner with frictional electricity is enlarged excessively. Therefore, the lubricity deteriorates, thus causing the irregular density to take place. Therefore, it is preferable that the JISA hardness be 50° or higher. If the rubber is too hard, then the area of contact is reduced, thus causing the frictional charge to be inhibited. In this case, irregular density takes place or undesirable lines appear. Therefore, it is preferable that the JISA hardness be 80° or lower, and more preferably 60° to 70°.

If the compression set (JIS K6301) takes place excessively in the elastic blade, irreversible deformation occurring due to plastic flow in the rubber with respect to the contact pressure, that is, creep takes place if the elastic blade is in contact with the developing sleeve for a long time. Thus, the contact area increases in accordance with the diameter of the cylindrical developing sleeve, causing a problem of irregular density to arise. If only the rubber elastic member is used to form the elastic blade, the contact pressure is reduced due to the creep. Therefore, irregular thickness of the toner applied to the developing sleeve takes place or blooming occurs in which a full white portion is undesirably formed when a solid black image is intended to be output on paper due to unsatisfactory frictional charge with electricity. As a result, it is preferable that the compression set be 20% or less, and more preferably 10% or less.

Examples and comparative examples of the present invention will now be described.

EXAMPLE 1

Rubber

| | |
|---|---|
| ethylene adipate type urethane polymer (PEA) (Mn1500 manufactured by Nihon PolyUrethane, NCO 6.2 wt %) | 100 g |

Hardening Material

| | |
|---|---|
| 1,4-butandiol | 3.9 g |
| trimethylol propane | 2.1 g |

Catalyst

| | |
|---|---|
| triethylene diamine (TEDA) | 2000 ppm |

Material for Preventing Hydrolysis

| | |
|---|---|
| Stabaxol-1 (Carbodimide-type Material) | 1.0 g |

Anti-Oxidant

| | |
|---|---|
| Irganox 1035 | 0.5 g |
| Molding Condition | 130° C. for 30 minutes |
| Secondary Molding Temperature | 130° C. for 4 hours |

The hardening agent was added to the heated and thus dissolved urethane prepolymer, and the mixed materials were injected into a heated mold so as to be heated and hardened so that a predetermined shape was formed.
Physical Properties of the Obtained Member Hardness of the Rubber JISA 62, Compression Set

EXAMPLE 2

Rubber

| | |
|---|---|
| ethylene adipate type urethane polymer (PEA) (Mn1500 manufactured by Nihon PolyUrethane, NCO 6.2 wt %) | 100 g |

Hardening Material

| | |
|---|---|
| 1,4-butandiol | 3.9 g |
| trimethylol propane | 2.1 g |

Catalyst

| | |
|---|---|
| pentamethyl diethylene triamine (PMDETA) | 2000 ppm |

Material for Preventing Hydrolysis

| | |
|---|---|
| Stabaxol-1 (Carbodimide-type Material) | 1.0 g |

Anti-Oxidant

| | |
|---|---|
| Irganox 1035 | 0.5 g |
| Molding Condition | 130° C. for 30 minutes |
| Secondary Molding Temperature | 130° C. for 4 hours |

The hardening agent was added to the heated and thus dissolved urethane prepolymer, and the mixed materials were injected into a heated mold so as to be heated and hardened so that a predetermined shape was formed.
Physical Properties of the Obtained Member Hardness of the Rubber JISA 62, Permanent Set (70°) 10%

EXAMPLE 3

Rubber

| | |
|---|---|
| ethylene butylene type urethane prepolymer (PEBA) (Mn1500 manufactured by Nihon PolyUrethane, NCO 6.2 wt %) | 100 g |

Hardening Material

| | |
|---|---|
| 1,4-butandiol | 3.9 g |
| trimethylol propane | 2.1 g |

Catalyst

| | |
|---|---|
| triethylene diamine (TEDA) | 2000 ppm |

Material for Preventing Hydrolysis

| | |
|---|---|
| Stabaxol-1 | 1.0 g |

Anti-Oxidant

| | |
|---|---|
| Irganox 1035 | 0.5 g |
| Molding Condition | 130° C. for 30 minutes |
| Secondary Molding Temperature | 130° C. for 4 hours |

The hardening agent was added to the heated and thus dissolved urethane prepolymer, and the mixed materials were injected into a heated mold so as to be heated and hardened so that a predetermined shape was formed.
Physical Properties of the Obtained Member Hardness of the Rubber JISA 66, Permanent Set (70°) 12%

COMPARATIVE EXAMPLE 1

Rubber

| | |
|---|---|
| ethylene adipate type urethane prepolymer (PEA) (Mn1500 manufactured by Nihon PolyUrethane, NCO 6.2 wt %) | 100 g |

Hardening Material

| | |
|---|---|
| 1,4-butandiol | 3.9 g |
| trimethylol propane | 2.1 g |

Catalyst

| | |
|---|---|
| dibutyltin dilaurate (DBTDL) | 1500 ppm |

Material for Preventing Hydrolysis

| | |
|---|---|
| Stabaxol-1 (carbodiimide) | 1.0 g |

Anti-Oxidant

| | |
|---|---|
| Irganox 1035 | 0.5 g |
| Molding Condition | 130° C. for 30 minutes |
| Secondary Molding Temperature | 130° C. for 4 hours |

The hardening agent was added to the heated and thus dissolved urethane prepolymer, and the mixed materials were injected into a heated mold so as to be heated and hardened so that a predetermined shape was formed.
Physical Properties of the Obtained Member Hardness of the Rubber JISA 62, Permanent Set (70°) 12%

The thus manufactured urethane elastic blade was mounted on the developing unit, and then the developing unit was loaded in a laser beam printer (Lasershot manufactured by Canon) in an ambient environment in which the temperature was 32.5° C. and the relative humidity was 90%. Then, the printing test was performed such that an image was output one time per three days for one month continuously.

Results of the hydrolysis resistance test are shown in Table 1.

As can be understood from the table, Examples 1 to 3 exhibited excellent capability of preventing irregular density and blooming as compared with Comparative Example 1. Thus, the superiority of the amine-type catalyst was confirmed.

TABLE 1

|  | Example 1 | Example 2 | Example 3 | Comparative Example 1 |
|---|---|---|---|---|
| Polyol | PEA | PEA | PEBA | PEA |
| Catalyst | TEDA | PMDETA | TEDA | DBTDL |
| (ppm) | 2000 | 2000 | 2000 | 1500 |
| Material for Preventing Hydrolysis (g) | Stabaxol-1 1 | Stabaxol-1 1 | Stabaxol-1 1 | Stabaxol-1 1 |
| Anti-Oxidant (g) | 1035 0.5 | 1035 0.5 | 1035 0.5 | 1035 0.5 |
| JISA Hardness of Elastic Layer | 62 | 62 | 66 | 62 |
| Compression Set (%) Test for One Month | 9 | 10 | 12 | 9 |
| Irregular Density | ○ | ○ | ○ | Δ |
| Lines | ○ | ○ | ○ | ○ |
| Fog | ○ | ○ | ○ | X |

Note
(1) Shape of the elastic blade: 240 × 15 × 1 mm (thickness)
(2) Hardness of the rubber: JISA hardness of spring confirming to JIS K6301
(3) Compression set: compressed by 25% at 70° C. for 22 hours conforming to JIS K6301.

Although the invention has been described in its preferred form with a certain degree of particularity, it is understood that the present disclosure of the preferred form can be changed in the details of construction and the combination and arrangement of parts may be resorted to without departing from the spirit and the scope of the invention as hereinafter claimed.

What is claimed is:

1. A member for regulating the quantity of a developer comprising a polyurethane rubber composition containing an amine catalyst.

2. A member for regulating the quantity of a developer according to claim 1, wherein said amine catalyst is at least one compound selected from a group consisting of triethylene diamine and pentamethyldiethylene triamine.

3. A member for regulating the quantity of a developer according to claim 1, wherein a polyol component of said polyurethane rubber composition is polyester-type polyol.

4. A member for regulating the quantity of a developer according to claim 1, wherein a polyester-type polyol of a polyol component of said polyurethane rubber composition is at least one compound selected from a group consisting of ethylene adipate type polyester polyol and ethylene butylene type polyol.

5. A member for regulating the quantity of a developer according to claim 1, wherein said amine catalyst comprises at least one compound selected from a group consisting of triethylene diamine, pentamethyldiamine and pentamethyl diethylene triamine, and said polyurethane rubber composition comprises a polyester-type polyol.

6. A member for regulating the quantity of a developer according to claim 1, wherein a material for preventing hydrolysis and anti-oxidant are contained in said polyurethane rubber composition.

7. A member for regulating the quantity of a developer according to claim 5, wherein said polyurethane rubber composition contains a material for preventing hydrolysis and anti-oxidant.

8. A developing unit comprising: a container for accommodating a developer; a member for carrying said developer supplied from said container to a developing portion; and a member for regulating the quantity of said developer to be applied to the surface of said member for carrying said developer, wherein said member for regulating the quantity of said developer comprises a polyurethane rubber composition that contains an amine-type catalyst.

9. A developing unit according to claim 8, wherein said polyurethane rubber composition comprises a polyester-type polyol.

10. A developing unit according to claim 8, wherein said amine catalyst comprises at least one compound selected from a group consisting of triethylene diamine, pentamethyl diamine and pentamethyl diethylene triamine, and said polyurethane rubber composition comprises a polyester-type polyol.

* * * * *

UNITED STATES PATENT AND TRADEMARK OFFICE
CERTIFICATE OF CORRECTION

PATENT NO. : 5,587,776
DATED : December 24, 1996
INVENTOR(S) : MASAHIRO WATABE, ET AL.

It is certified that error appears in the above-indentified patent and that said Letters Patent is hereby corrected as shown below:

COLUMN 1

Line 42, "blade" should read --blade 4--.
Line 44, "and B" should read --and B,--.

COLUMN 4

Line 51, "1035" should read --1035 or--.

COLUMN 5

Line 44, "Compression Set" should read --Compression Set (70°) 9%--.

Signed and Sealed this

Twentieth Day of May, 1997

Attest:

BRUCE LEHMAN

*Attesting Officer*     Commissioner of Patents and Trademarks